US012676137B2

(12) United States Patent
Sharma

(10) Patent No.: US 12,676,137 B2
(45) Date of Patent: Jul. 7, 2026

(54) SYSTEM AND METHOD FOR MULTI-CHANNEL SPEECH PRIVACY PROCESSING

(71) Applicant: Microsoft Technology Licensing, LLC, Redmond, WA (US)

(72) Inventor: Dushyant Sharma, Tracy, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 18/318,185

(22) Filed: May 16, 2023

(65) Prior Publication Data

US 2024/0296826 A1      Sep. 5, 2024

Related U.S. Application Data

(60) Provisional application No. 63/449,785, filed on Mar. 3, 2023.

(51) Int. Cl.
G10L 13/02 (2013.01)
G10L 15/14 (2006.01)

(52) U.S. Cl.
CPC .............. G10L 13/02 (2013.01); G10L 15/14 (2013.01)

(58) Field of Classification Search
CPC . G10L 13/02; G10L 15/14; G10L 2021/0135; G10L 21/00; G10L 13/00; G10L 21/003; G06F 21/6254
USPC ........................................................ 704/251
See application file for complete search history.

(56) References Cited

U.S. PATENT DOCUMENTS

| | | | |
|---|---|---|---|
| 10,885,902 B1 | 1/2021 | Papania-Davis | |
| 12,087,319 B1 | 9/2024 | Looney | |
| 2014/0278397 A1 | 9/2014 | Chen et al. | |
| 2016/0098987 A1* | 4/2016 | Stolcke .................. | G10L 15/16 |
| | | | 704/232 |
| 2017/0278527 A1 | 9/2017 | Sharma et al. | |
| 2021/0035551 A1* | 2/2021 | Stanton .................. | G10L 13/04 |
| 2021/0335337 A1* | 10/2021 | Gkoulalas-Divanis ..................... | |
| | | | G10L 15/26 |
| 2021/0350815 A1 | 11/2021 | Sharma et al. | |
| 2022/0399026 A1 | 12/2022 | Gong et al. | |
| 2023/0267944 A1 | 8/2023 | Sharma | |

(Continued)

FOREIGN PATENT DOCUMENTS

| | | |
|---|---|---|
| CN | 107071636 A | 8/2017 |
| WO | 2021119102 A1 | 6/2021 |

(Continued)

OTHER PUBLICATIONS

Notice of Allowance mailed on Jun. 13, 2025, in U.S. Appl. No. 17/974,674 10 pages.

(Continued)

*Primary Examiner* — Paras D Shah
*Assistant Examiner* — Fouzia Hye Solaiman
(74) *Attorney, Agent, or Firm* — Foley IP Law, PLLC

(57) ABSTRACT

A method, computer program product, and computing system for receiving a speech signal from a single microphone. A sensitive speech component is identified from the speech signal. In response to identifying the sensitive speech component, a filtered speech signal is generated by removing the sensitive speech component from the speech signal. A voice style transfer of the speech signal is generated. Speech processing is performed on the filtered speech signal and the voice style transfer of the speech signal.

19 Claims, 3 Drawing Sheets

(56)                References Cited

U.S. PATENT DOCUMENTS

| | | |
|---|---|---|
| 2023/0410789 A1 | 12/2023 | Sharma |
| 2023/0410814 A1* | 12/2023 | Yin ...................... G10L 15/063 |
| 2024/0144936 A1 | 5/2024 | Sharma |

FOREIGN PATENT DOCUMENTS

| | | |
|---|---|---|
| WO | 2021183657 A1 | 9/2021 |
| WO | 2023177095 A1 | 9/2023 |

OTHER PUBLICATIONS

Gong, et al., "Self-Attention Channel Combinator Frontend for End-to-End Multichannel Far-field Speech Recognition", In Repository of arXiv:2109.04783v1, Sep. 10, 2021, 5 Pages.

Pascual, et al., "Learning Problem-agnostic Speech Representations from Multiple Self-supervised Tasks", In Repository of arXiv:1904.03416v1, Apr. 6, 2019, 5 Pages.

Grais et al., "Deep neural networks for single channel source separation," IEEE International Conference on Acoustics, Speech and Signal Processing (ICASSP), pp. 3734-3738, May 4, 2014.

Grais et al., "Single-Channel Audio Source Separation Using Deep Neural Network Ensembles," AES Convention 140, 7 Pages, May 26, 2016.

Invitation to Pay Additional Fees received for PCT Application No. PCT/US2023/034600, mailed on Jan. 22, 2024, 14 pages.

International Search Report and Written Opinion received for PCT Application No. PCT/US2024/017370, May 6, 2024, 12 pages.

Shahin-Shamsabadi, et al., "Differentially private speaker anonymization." arXiv:2202.11823, Feb. 23, 2022, pp. 1-17.

International Search Report and Written Opinion received for PCT Application No. PCT/US23/034600, Mar. 14, 2024, 21 pages.

International Preliminary Report on Patentability (Chapter 1) received for PCT Application No. PCT/US2023/034600, May 8, 2025, 14 pages.

Non-Final Office Action mailed on Nov. 8, 2024, in U.S. Appl. No. 17/974,674, 15 pages.

International Preliminary Report on Patentability (Chapter I) received for PCT Application No. PCT/US2024/017370 mailed on Sep. 18, 2025, 06 Pages.

* cited by examiner

10

SYSTEM AND METHOD FOR MULTI-CHANNEL SPEECH PRIVACY PROCESSING

RELATED APPLICATION(S)

This application claims the benefit of U.S. Provisional Application No. 63/449,785, filed on 3 Mar. 2023, the entire contents of which is incorporated herein by reference.

BACKGROUND

The voice of a user of a speech processing system is considered Personally Identifiable Information (PII). A known solution to solve this problem is to exploit voice style transfer (VST) or voice conversion (VC) algorithms to convert the voice to that of a licensed actor, for example. The intent of such approaches to use the target voice of a speaker whose speech content is licensed or otherwise approved for use without violating privacy rights of the individual. However, when doing such processing, subsequent speech processing systems or algorithms may be adversely affected, such as automated speech processing (ASR) because the conversion process is imperfect and does not typically model the background acoustics well.

BRIEF DESCRIPTION OF THE DRAWINGS

Like reference symbols in the various drawings indicate like elements.

DETAILED DESCRIPTION OF THE PREFERRED EMBODIMENTS

Figure 1:
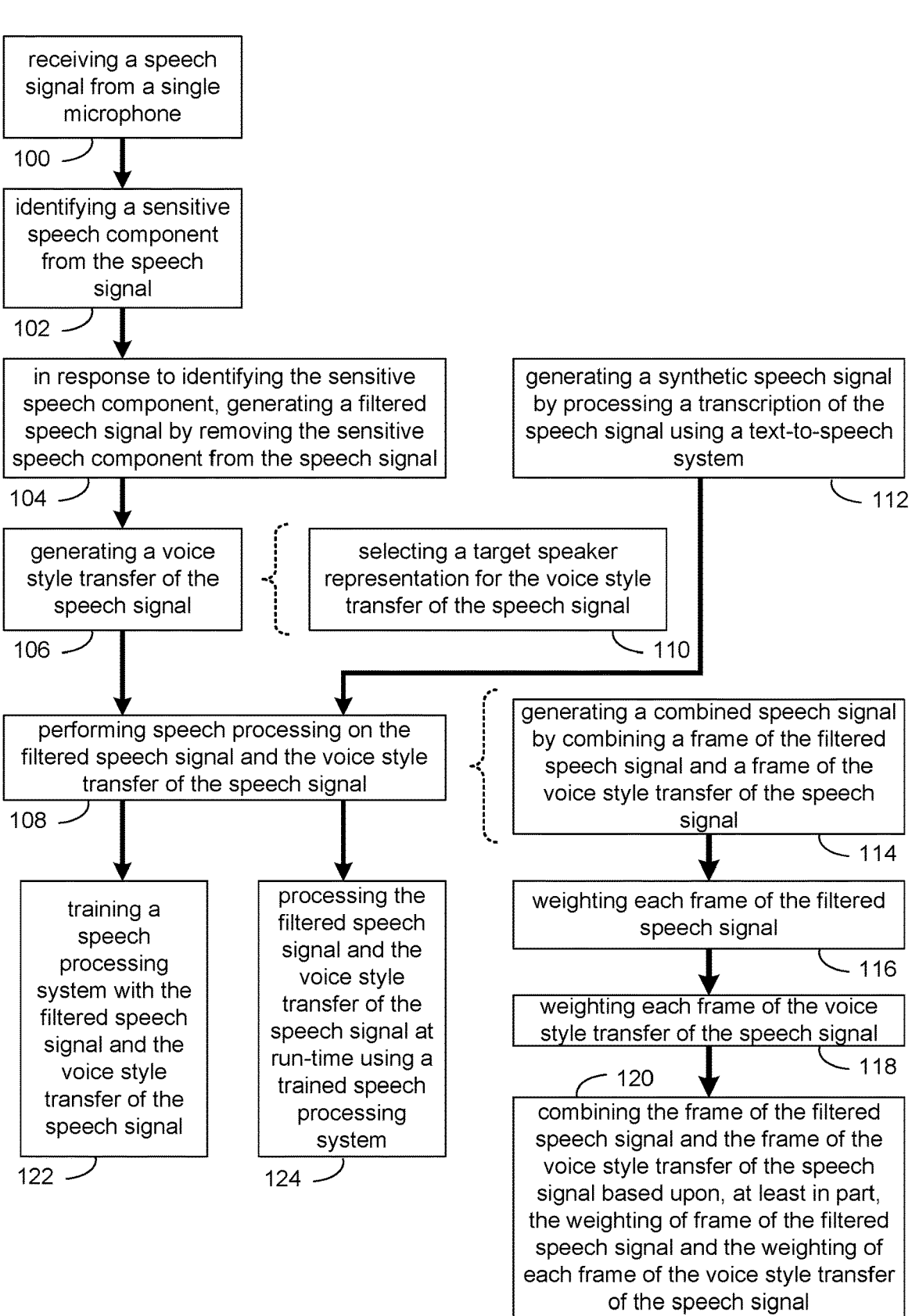
FIG. 1 is a flow chart of one implementation of the multi-channel speech privacy process of FIG. 1.

Implementations of the present disclosure exploit a multi-channel front end to a speech processing system to enhance the privacy of user's speech characteristics. For example, implementations of the present disclosure target and remove a speaker's voice characteristics (e.g., when the speaker's voice is considered PII). In order to improve the PII aspect of the signal, the present disclosure exploits the use of Voice Style Transfer (VST) to map the voice of the original signal to that of a licensed voice. In some implementations, a text-to-speech (TTS) system is used in place or together with the original signal. The number of voices used for the VST processing include one or more voices. In one example, there is a speaker selection system present during training or testing. Accordingly, the speech signal in one channel is either the original speech signal or noise (e.g., depending on whether the utterance/segment of speech is to be de-identified) and another channel is the voice style transferred version (to the voice of a licensed actor). Additionally, various channels of TTS and VST data may also be used. Moreover, the constraints during training and testing of speech processing systems call for a flexible structure whereby a mixture of de-identified and original data may be used. For example, in the context of training data, researchers or developers in an organization typically have access to purchased or publicly available data which comes with consent to use that data as-is and therefore only a subset of the training data typically needs to be acoustically de-identified. Accordingly, implementations of the present disclosure allow for both original data and de-identified data to be processed together to enhance speech processing system training.

The details of one or more implementations are set forth in the accompanying drawings and the description below. Other features and advantages will become apparent from the description, the drawings, and the claims.

The Multi-Channel Speech Privacy Process:

The ubiquitous deployment of automatic speech recognition (ASR)-based smart voice systems demands a greater effort in the protection of Personal Identifiable Information (PII). The need for such privacy protection is fueled not only by the recent privacy legislation, e.g. the general data protection regulation (GDPR) in Europe, but also by an increasing user-awareness of privacy issues.

As an example, it is clear that many individuals, particularly in the case of well-known public figures, can be identified by the sound of their voice. Therefore, in order to de-identify a speech signal, such as might be used for ASR-based systems, it is necessary to remove, from all such utterances, any identifiable acoustic information so that the speaker's voice cannot be recognized, such as by changing vocal characteristics. Whereas such approaches serve to improve the speaker's privacy, they have the tendency to introduce characteristics that may degrade ASR accuracy as measured, for example, in terms of the Word Error Rate (WER). Accordingly, multi-channel speech privacy process 10 preserves, and in some implementations, enhances, WER while at the same time using de-identified speech data as input to a deployed speech processing system.

As will be discussed in greater detail below, implementations of the present disclosure use the voice of a registered speaker as the target for a voice conversion (VC) system as a means for achieving de-identification of the original speaker's voice. In previous approaches, the target speaker embedding is chosen in a way that improves privacy, by clustering all known speaker embeddings in the training data and finding an embedding that is maximally separated from known centroids. This approach however does not guarantee the new speakers voice will be (a) well synthesized, nor (b) that they will result in a voice that is indistinguishable from another in the training set (i.e., there is a chance that the new voice may sound like someone in the training or test data). In this approach, the speaker embedding of a known and registered speaker is used as the target for voice conversion. Accordingly, the target voice is one that is registered for use and since only one voice is used for all the data, this can lead to a better anonymization. Also, in a system where only one target speaker is needed, it is possible to fine tune or retrain a VC system to synthesize to the target speaker's voice (i.e., since this is a many-to-one transformation compared to a many-to-many transformation). For example, in one implementation, a single, canonical target speaker is used for voice conversion (i.e., voice style transfer). Accordingly, the VC system is trained to synthesize the original speaker's voice to the single, canonical target speaker's voice. In another implementation, multiple target speakers are used to generate multiple voice style transfers.

Figure 2:
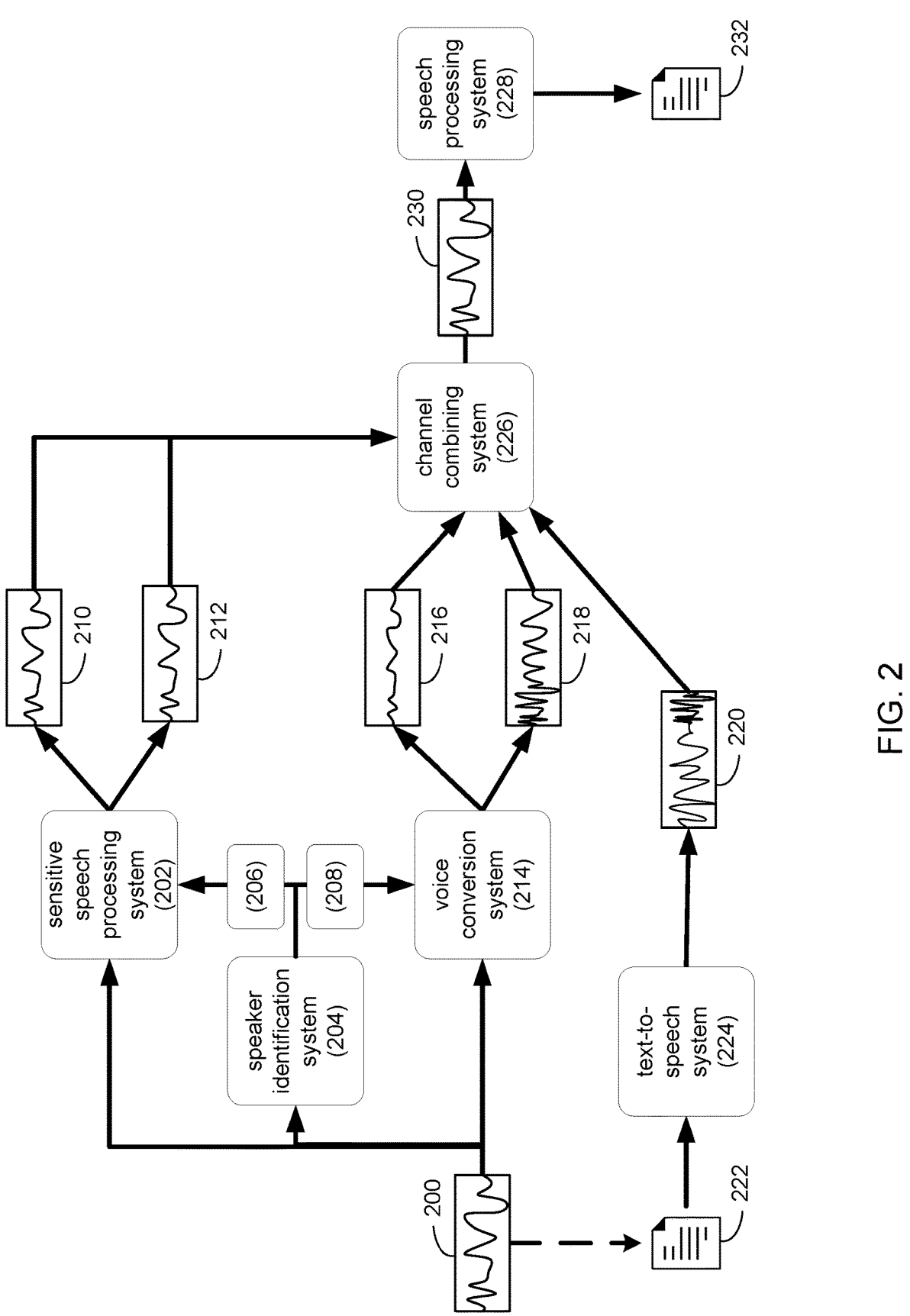
FIG. 2 is a diagrammatic view of the multi-channel speech privacy process of FIG. 1.
Figure 3:
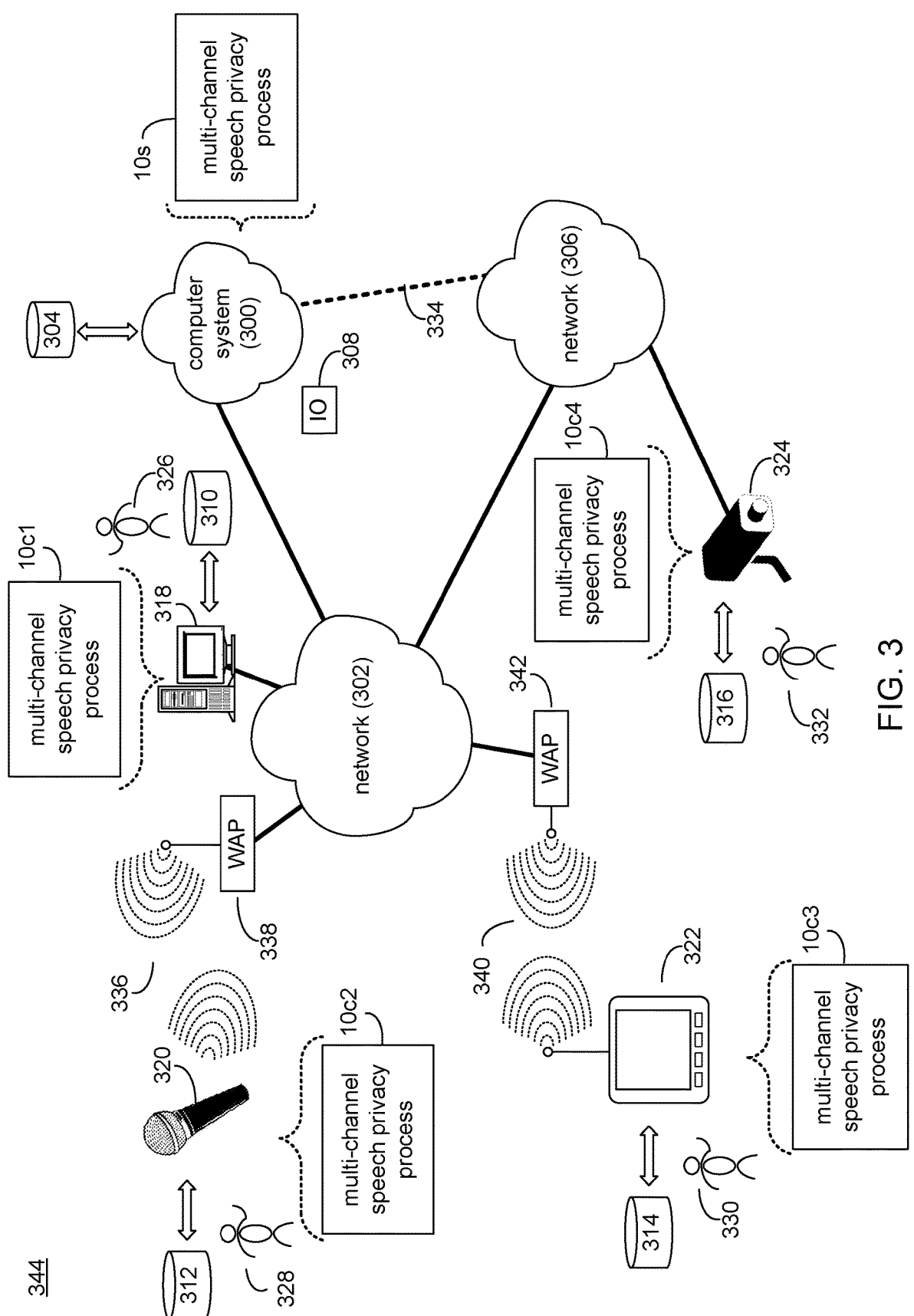
FIG. 3 is a diagrammatic view of computer system and a multi-channel speech privacy process coupled to a distributed computing network.

Referring to FIGS. 1-3, multi-channel speech privacy process 10 receives 100 a speech signal from a single microphone. A sensitive speech component is identified 102 from the speech signal. In response to identifying the sensitive speech component, a filtered speech signal is generated 104 by removing the sensitive speech component from the speech signal. A voice style transfer of the speech signal is generated 106. Speech processing is performed 108 on the filtered speech signal and the voice style transfer of the speech signal.

In some implementations, multi-channel speech privacy process 10 receives 100 a signal from a single microphone or other audio acquisition device. For example and as discussed above, an audio recording system receives and records an input speech signal. Referring also to FIG. 2, multi-channel speech privacy process 10 receives an input speech signal (e.g., speech signal 200). In one example, speech signal 200 is received and recorded by an audio recording system and/or may be a previously recorded audio input signal (e.g., an audio signal stored in a database or other data structure). In one example, suppose that speech signal 200 concerns a medical encounter between a medical professional and a patient. In this example, the patient may be asked by the medical professional to audibly confirm personal identification information (e.g., name, date of birth, marital status, etc.) during a medical examination. Additionally, the patient may describe personal health information (e.g., symptoms, medical history, etc.). As will be discussed in greater detail below, multi-channel speech privacy process 10 processes the input speech signal to generate a transcription and/or to populate medical records automatically.

In some implementations, multi-channel speech privacy process 10 identifies 102 a sensitive speech component from the speech signal. A sensitive speech component is a portion of Personal Identifiable Information (PII). For example, two elements in speech can identify the talker and therefore constitute PII: 1) the use of proper names, address and other personal information including for example financial data, health details, and culturally or ethnically specific information; and/or 2) the sound of the speaker's voice as determined by factors including pitch and pitch variation, vocal timbre, tempo and other accent-related characteristics.

In one example and as shown in FIG. 2, multi-channel speech privacy process 10 includes a sensitive speech processing system (e.g., sensitive speech processing system 202) configured to identify sensitive speech components in the speech signal (e.g., speech signal 200). A sensitive speech processing system is a hardware and/or software component configured to receive speech signals and identify or flag sensitive speech components. In one example, sensitive speech processing system 202 uses a speaker identification system (e.g., speaker identification system 210) to segment speech signal 200 into a plurality of segments or signals based upon each distinct speaker detected in each segment of the speech signal. In one example, speaker identification system 210 is a speaker diarization system. Speaker diarization is a speech processing approach configured to partition an input audio stream into homogeneous segments according to the speaker identity. In one example, suppose a speaker diarization system processes speech signal 200 and generates e.g., two streams or segments for e.g., two discrete speakers. Accordingly, multi-channel speech privacy process 10 partitions speech signal 200 into segments associated with a first speaker and other segments associated with a second speaker. In this example, the speaker diarization system may not know the identity of each speaker but may recognize the acoustic properties of speech signals unique to each speaker.

In another example, speaker selection system 204 provides a reference to each speaker of each portion of speech signal 200 (e.g., per frame or any other segment of speech signal 200). As shown in FIG. 2 speaker selection system 204 provides references 206, 208 indicating speech portions associated with each speaker (e.g., reference 206 for the medical professional and reference 208 for the patient). In one example, reference 206 includes a list of portions of speech signal associated with the medical professional while reference 208 includes a list of portions of speech signal 200 associated with the patient. In another example where speech signal 200 is processed in real-time, speaker selection system 208 continuously provides references 206, 208 as each portion of speech signal 200 is processed.

In another example, speaker identification system 204 is a speaker verification system configured to segment the audio (e.g., speech signal 200) into a plurality of speaker-specific signals or segments. In this example, the speaker verification system has access to the voiceprint of each encounter participant. For example, multi-channel speech privacy process 10 accesses a database or other source of voiceprints associated with a plurality of known speakers. Accordingly, multi-channel speech privacy process 10 uses a speaker verification system to determine the identify of each speaker in speech signal 200 with the speech portions associated with a doctor and speech portions associated with a patient. In this manner, speech portions associated with particular speakers are identified.

In some implementations, multi-channel speech privacy process 10 identifies 102 a sensitive speech component from the speech signal. In one example, multi-channel speech privacy process 10 allows users to register a particular voice as sensitive speech (i.e., PII) with a speaker diarization system and/or a speaker verification system as described above. Accordingly, multi-channel speech privacy process 10 automatically performs sensitive speech component filtering based on speaker diarization or speaker verification. In another example, multi-channel speech privacy process 10 provides a user interface configured to receive a selection of particular portions or voice characteristics to identify 102 as sensitive speech components from speech signal 200.

In some implementations and in response to identifying the sensitive speech component, multi-channel speech privacy process 10 generates 104 a filtered speech signal by removing the sensitive speech component from the speech signal. For example, suppose a doctor's voice is registered (in the manner described above) as PII. Accordingly, multi-channel speech privacy process 10 processes speech signal 200 (i.e., a recorded dialogue between a doctor and a patient) and identifies 102 sensitive speech components from speech signal 200 associated with the doctor and identifies speech components from speech signal 200 associated with the patient. In this example, multi-channel speech privacy process 10 removes sensitive speech components associated with the doctor to generate 104 a filtered speech signal (e.g., filtered speech signal 210) and passes through speech components associated with the patient (e.g., original speech signal portions 212). In one example, removing the sensitive speech components includes replacing the sensitive speech components with a noise signal. In another example, removing the sensitive speech components includes replacing the sensitive speech components with digital "zeros" or by total acoustic cancellation.

In some implementations, multi-channel speech privacy process 10 generates 106 a voice style transfer of the speech signal. A voice style transfer, also called voice conversion, is the modification of a speaker's voice to generate speech as if it came from another (target) speaker. For example, multi-channel speech privacy process 10 generates 106 a voice style transfer of the speech signal using a voice conversion system (e.g., voice conversion system 214). In some implementations, multi-channel speech privacy process 10 generates 106 a voice style transfer (e.g., voice style transfers 216, 218) of speech signal 200 using a target speaker. Generating 106 a voice style transfer (e.g., voice style transfers 216, 218) includes modifying the acoustic characteristics of speech signal 200 to match (or generally match subject to a predefined threshold) a target speaker representation. In some implementations, the target speaker includes a predefined set of acoustic characteristics associated with a particular speaker.

In some implementations, generating 106 the voice style transfer of the speech signal includes selecting 110 a target speaker representation for the voice style transfer of the speech signal. As shown in FIG. 2, multi-channel speech privacy process 10 includes a speaker selection system (e.g., speaker selection system 208) for selecting 110 a target speaker representation and generating 106 the voice style transfer of the speech signal (e.g., voice style transfers 216, 218). Voice style transfer 216 represents a voice style transfer of speech signal 200 to a first target speaker representation and voice style transfer 218 represents a voice style transfer of speech signal 200 to a second target speaker representation.

In one example, selecting 110 a target speaker representation for the voice style transfer includes selecting (e.g., automatically and/or as a predefined setting) a closest match (i.e., closest matching) between the speech signal and a target speaker representation. For example, multi-channel speech privacy process 10 may compare acoustic embeddings of the speech signal and each target speaker representation of a database of target speaker representations to determine a closest match. In this example, the closest match may be most vulnerable to identifying a speaker associated with a speech signal given the closeness between the speech signal and the target speaker representation.

In another example, selecting 110 a target speaker representation for the voice style transfer includes selecting (e.g., automatically and/or as a predefined setting) a furthest match (i.e., least matching) between the speech signal and a target speaker representation. For example, multi-channel speech privacy process 10 may compare acoustic embeddings of the speech signal and each target speaker representation of a database of target speaker representations to determine a furthest match/least matching target speaker representation. In this example, the furthest match may be less vulnerable to identifying a speaker associated with the speech signal given the difference between the speech signal and the target speaker representation. In another example, multi-channel speech privacy process 10 selects 110 a random target speaker representation In some implementations, multi-channel speech privacy process 10 generates 112 a synthetic speech signal by processing a transcription of the speech signal using a text-to-speech system. For example, suppose that multi-channel speech privacy process 10 is training a speech processing system using the original speech signal (e.g., speech signal 200), filtered speech signal 210, and voice style transfers 216, 218. In this example, multi-channel speech privacy process 10 enhances the speech processing system by including a synthetic speech signal (e.g., synthetic speech signal 220) generated 112 a predefined transcription (e.g., transcription 222) using a text-to-speech system (e.g., text-to-speech system 224). Synthetic speech signal 220 is generally free from any noise or reverberation associated with a particular acoustic environment. Accordingly, the speech processing system may use frames from synthetic speech signal 220 to enhance speech processing in noisy or highly reverberant frames in speech signal 200, filtered speech signal 212, and/or voice style transfers 216, 218). In some implementations, one ASR system (i.e. a low cost one) is used on the test data to obtain a transcription (e.g., transcription 222) from which to generate synthetic speech signal 220. In this manner, multiple outputs from different ASR models are combined to help reduce WER.

In some implementations, multi-channel speech privacy process 10 performs 108 speech processing on the filtered speech signal and the voice style transfer of the speech signal. For example, speech processing includes processing the combination of original speech signal, filtered speech signal, and the voice style transfer of the speech signal. In some implementations, speech processing includes automated speech recognition (ASR), speaker identification, biometric speaker verification, etc. As will be discussed in greater detail below, multi-channel speech privacy process 10 performs 108 speech processing using a channel combining system (e.g., channel combining system 226) and a speech processing system (e.g., speech processing system 228).

In some implementations, performing 108 speech processing on the filtered speech signal and the voice style transfer of the speech signal includes generating 114 a combined speech signal by combining a frame of the filtered speech signal and a frame of the voice style transfer of the speech signal. For example, speech signal 200 includes a plurality of portions of frames of predefined length (e.g., in the time domain) or time-frequency bins of a predefined size (e.g., in the frequency domain). Each frame may be processed separately to select the most effective frame for speech processing purposes. For example, as discussed above, suppose filtered speech signal 212 includes multiple frames that have no speech (e.g., where the speech components have been removed). In this example, using a frame of filtered speech signal 212 in a speech processing system would result in poor speech processing performance. Accordingly, multi-channel speech privacy process 10 combines various frames from the speech signal, the filtered speech signal, and the voice style transfer of the speech signal to maximize the quality of the combined speech signal for processing with a speech processing system.

In some implementations, generating 114 the combined speech signal includes: weighting 116 each frame of the filtered speech signal; weighting 118 each frame of the voice style transfer of the speech signal; and combining 120 the frame of the filtered speech signal and the frame of the voice style transfer of the speech signal based upon, at least in part, the weighting of frame of the filtered speech signal and the weighting of each frame of the voice style transfer of the speech signal. Multi-channel speech privacy process 10 uses the plurality of modified signals to enhance the properties of the original speech signal without exposing sensitive speech components of the original speech signal. Many end-to-end speech processing systems (e.g., end-to-end ASR) are configured as back-end systems (e.g., deployed on a server) to process a single speech signal. As opposed to providing only the original speech signal (as in conventional approaches) with sensitive speech components, multi-channel speech privacy process 10 selectively combines frames from the speech signal, the filtered speech signal, and the voice style transfer of the speech signal, to generate a combined signal.

For example and as shown in FIG. 2, multi-channel speech privacy process 10 provides speech signal 200, filtered speech signal 212, voice style transfers 216 218, and synthetic speech signal 220 to a channel combining system (e.g., channel combining system 226). As will be discussed in greater detail below, a channel combining system is a software and/or hardware component or system configured to combine multi-channel input into a single channel representation of the multi-channel input.

In some implementations, generating 114 the combined signal includes weighting 116 each frame of the filtered speech signal; weighting 118 each frame of the voice style transfer of the speech signal; and combining 120 the frame of the filtered speech signal and the frame of the voice style transfer of the speech signal based upon, at least in part, the weighting of frame of the filtered speech signal and the weighting of each frame of the voice style transfer of the speech signal. For example, channel combining system 226 includes a weighting system configured to apply particular weights to each frame of speech signal 200, each frame of filtered speech signal 210, each frame of voice style transfers 216, 218, and each frame of synthetic speech signal 220. In one example, channel combining system includes a neural network or other machine learning system configured to receive speech signal 200, filtered speech signal 210, voice style transfers 216, 218, and synthetic speech signal 220 as inputs and apply weights to each frame of each signal to generate a single channel representation of the plurality of weighted modified speech signals. In this manner, the single channel representation (e.g., combined signal 230) is generated as a weighted sum of speech signal 200, filtered speech signal 210, voice style transfers 216, 218, and synthetic speech signal 220.

In some implementations, generating the combined signal includes combining the speech signal, the filtered speech signal, the voice style transfer, and the synthetic speech signal using a self-attention machine learning model. For example, channel combining system 226 includes a self-attention machine learning model as described in pending U.S. application Ser. No. 17/539,451 filed on Dec. 1, 2021 entitled "System and Method for Self-attention-based Combining of Multichannel Signals for Speech Processing", the entirety of which is incorporated by reference.

In another example, a recurrent neural network or self-attention machine learning model can be used. Self-attention is an attention mechanism relating different positions of a single sequence or signal in order to compute a representation of the same sequence or signal. Attention mechanisms define "important" portions or frames of one or more sequences or signals relative to other portions of the sequence(s) or signal(s). In the context of a multichannel representation of the plurality of channels, self-attention defines the plurality of channels in terms of channels or frames of channels that are more important for speech processing and portions that are less important for speech processing. For example, the weighted multichannel representation indicate which portions of a signals across a plurality of channels are important for speech processing and which portions of the signals not to focus on. In this manner, the various speech signals received by the channel combining system (e.g., channel combining system 226) are processed at the front end into a single channel representation (e.g., combined signal 230) that emphasizes the portions of the plurality of speech signals that are most important for speech processing.

In some implementations, performing 108 speech processing on the plurality of modified signals includes providing the plurality of modified signals to a multi-channel speech processing system. A multi-channel speech processing system is a speech processing system configured to process multiple channels by weighting particular portions of the multiple channels to produce an enhanced representation in noisy conditions with reverberation and echoes. As discussed above, conventional approaches to using multi-channel speech processing systems are unable to work effectively with just a single channel. However, by utilizing the plurality of modified signals, multi-channel speech processing systems are used in environments where only a single microphone channel is available. Referring again to FIG. 2, multi-channel speech privacy process 10 provides speech signal 200, filtered speech signal 210, voice style transfers 216, 218, and synthetic speech signal 220 to a multi-channel speech processing system (e.g., speech processing system 228). In this example, multi-channel speech processing system 228 generates a transcription (e.g., transcription 232) from speech signal 200, filtered speech signal 210, voice style transfers 216, 218, and synthetic speech signal 220 and/or populates medical records or other records using the content of the various signals.

In some implementations, performing 108 speech processing on the filtered speech signal and the voice style transfer of the speech signal includes training 122 a speech processing system with the filtered speech signal and the voice style transfer of the speech signal. For example, multi-channel speech privacy process 10 provides speech signal 200 to speech processing system 228 to train 122 speech processing system with speech signal 200, filtered speech signal 210, voice style transfers 216, 218, and synthetic speech signal 220 in the manner described above. For example, multi-channel speech privacy process 10 may use feedback regarding transcription 232 to tune the training of speech processing system 228.

In some implementations, performing 108 speech processing on the filtered speech signal and the voice style transfer of the speech signal includes processing 124 the filtered speech signal and the voice style transfer of the speech signal at run-time using a trained speech processing system. For example, using the above-described process at run-time using a trained speech processing system may include the same process as in training the speech processing system except for the generation of transcription 222 using an ASR system at run-time to generate synthetic speech signal 220. In one example, multi-channel speech privacy process 10 generates synthetic speech signal 220 at run-time by processing speech signal 200 using an ASR system to generate transcription 222 and processing transcription 222 using text-to-speech system 224. In another example, multi-channel speech privacy process 10 does not generate synthetic speech signal. Accordingly, processing 124 the filtered speech signal and the voice style transfer of the speech signal at run-time using a trained speech processing system in this example is identical to training the speech processing system as described above.

In some implementations, performing speech processing using speech signal 200, filtered speech signal 210, voice style transfers 216, 218, and synthetic speech signal 220 results in improvements in speech processing compared to conventional approaches. For example, in one implementation, four configurations are compared: 1) a speech processing system with a single channel microphone signal using the original speech signal without removing sensitive speech components; 2) a speech processing system with a single channel voice style transfer; 3) a speech processing system with a single channel filtered speech signal; and 4) a speech processing system of the above-described voice conversion and channel combining systems with the speech signal and a filtered speech signal. In a comparison of the four systems, a word error rate reduction (WERR) of 19% is realized using the above-described fourth configuration relative to the conventional, first configuration. Accordingly, implementations of the present disclosure provide an improvement in the technical field of speech processing compared to conventional single channel speech processing systems while allowing for the protection of sensitive speech components.

System Overview:

Referring to FIG. 3, there is shown multi-channel speech privacy process 10. Multi-channel speech privacy process 10 may be implemented as a server-side process, a client-side process, or a hybrid server-side/client-side process. For example, multi-channel speech privacy process 10 may be implemented as a purely server-side process via multi-channel speech privacy process 10s. Alternatively, multi-channel speech privacy process 10 may be implemented as a purely client-side process via one or more of multi-channel speech privacy process 10c1, multi-channel speech privacy process 10c2, multi-channel speech privacy process 10c3, and multi-channel speech privacy process 10c4. Alternatively still, multi-channel speech privacy process 10 may be implemented as a hybrid server-side/client-side process via multi-channel speech privacy process 10s in combination with one or more of multi-channel speech privacy process 10c1, multi-channel speech privacy process 10c2, multi-channel speech privacy process 10c3, and multi-channel speech privacy process 10c4.

Accordingly, multi-channel speech privacy process 10 as used in this disclosure may include any combination of multi-channel speech privacy process 10s, multi-channel speech privacy process 10c1, multi-channel speech privacy process 10c2, multi-channel speech privacy process 10c3, and multi-channel speech privacy process 10c4.

Multi-channel speech privacy process 10s may be a server application and may reside on and may be executed by a computer system 300, which may be connected to network 302 (e.g., the Internet or a local area network). Computer system 300 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 300 may execute one or more operating systems.

The instruction sets and subroutines of multi-channel speech privacy process 10s, which may be stored on storage device 304 coupled to computer system 300, may be executed by one or more processors (not shown) and one or more memory architectures (not shown) included within computer system 300. Examples of storage device 304 may include but are not limited to: a hard disk drive; a RAID device; a random access memory (RAM); a read-only memory (ROM); and all forms of flash memory storage devices.

Network 302 may be connected to one or more secondary networks (e.g., network 304), examples of which may include but are not limited to: a local area network; a wide area network; or an intranet, for example.

Various IO requests (e.g., IO request 308) may be sent from multi-channel speech privacy process 10s, multi-channel speech privacy process 10c1, multi-channel speech privacy process 10c2, multi-channel speech privacy process 10c3 and/or multi-channel speech privacy process 10c4 to computer system 300. Examples of IO request 308 may include but are not limited to data write requests (i.e., a request that content be written to computer system 300) and data read requests (i.e., a request that content be read from computer system 300).

The instruction sets and subroutines of multi-channel speech privacy process 10c1, multi-channel speech privacy process 10c2, multi-channel speech privacy process 10c3 and/or multi-channel speech privacy process 10c4, which may be stored on storage devices 310, 312, 314, 316 (respectively) coupled to client electronic devices 318, 320, 322, 324 (respectively), may be executed by one or more processors (not shown) and one or more memory architectures (not shown) incorporated into client electronic devices 318, 320, 322, 324 (respectively). Storage devices 310, 312, 314, 316 may include but are not limited to: hard disk drives; optical drives; RAID devices; random access memories (RAM); read-only memories (ROM), and all forms of flash memory storage devices. Examples of client electronic devices 318, 320, 322, 324 may include, but are not limited to, personal computing device 318 (e.g., a smart phone, a personal digital assistant, a laptop computer, a notebook computer, and a desktop computer), audio input device 320 (e.g., a handheld microphone, a lapel microphone, an embedded microphone (such as those embedded within eyeglasses, smart phones, tablet computers and/or watches) and an audio recording device), display device 322 (e.g., a tablet computer, a computer monitor, and a smart television), machine vision input device 324 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 326, 328, 330, 332 may access computer system 300 directly through network 302 or through secondary network 306. Further, computer system 300 may be connected to network 302 through secondary network 306, as illustrated with link line 334.

The various client electronic devices (e.g., client electronic devices 318, 320, 322, 324) may be directly or indirectly coupled to network 302 (or network 306). For example, personal computing device 318 is shown directly coupled to network 302 via a hardwired network connection. Further, machine vision input device 324 is shown directly coupled to network 306 via a hardwired network connection. Audio input device 322 is shown wirelessly coupled to network 302 via wireless communication channel 336 established between audio input device 320 and wireless access point (i.e., WAP) 338, which is shown directly coupled to network 302. WAP 338 may be, for example, an IEEE 802.11a, 802.11b, 802.11g, 802.11n, Wi-Fi™, and/or Bluetooth™ device that is capable of establishing wireless communication channel 336 between audio input device 320 and WAP 338. Display device 322 is shown wirelessly coupled to network 302 via wireless communication channel 340 established between display device 322 and WAP 342, which is shown directly coupled to network 302.

The various client electronic devices (e.g., client electronic devices 318, 320, 322, 324) may each execute an operating system, wherein the combination of the various client electronic devices (e.g., client electronic devices 318, 320, 322, 324) and computer system 300 may form modular system 344.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method comprising:

receiving, by a speech processing system, an original speech signal recorded by a single microphone, the original speech signal containing voice characteristics of a user;

filtering the original speech signal to obtain a filtered speech signal that excludes the voice characteristics of the user;

performing voice conversion on the original speech signal to obtain a licensed voice signal containing voice characteristics of a licensed user, the voice characteristics of the user being excluded from the filtered speech signal, wherein the filtered speech signal and the licensed voice signal form a multi-channel input;

generating a single-channel representation of the multi-channel input by combining frames of the filtered speech signal with corresponding frames of the licensed voice signal in a weighted manner such that at least some frames of the filtered speech signal are assigned different weights; and performing, via an automatic speech recognition (ASR) model, speech recognition on the single-channel representation of the multi-channel input to generate a transcript of the original speech signal.

2. The method of claim 1, further comprising:

randomly selecting the licensed user from a group of target speaker representations.

3. The method of claim 1, further comprising:

generating a synthetic speech signal by processing the transcript using a text-to-speech system.

4. The method of claim 1, wherein speech recognition is performed on the single-channel representation during run-time of the speech processing system.

5. The method of claim 1, further comprising:

selecting the licensed user based on a closest matching target speaker representation from a group of target speaker representations.

6. The method of claim 1, further comprising:

selecting the licensed user based on a least matching target speaker representation from a group of target speaker representations.

7. The method of claim 1, wherein the frames of the filtered speech signal and the corresponding frames of the licensed voice signal are time-domain frames having a predefined length.

8. A computing system comprising:

a processor; and a memory storing programming instructions for execution by the processor, the programming instructions, upon execution by the processor, causing the computing system to perform the following operations:

receiving, by a speech processing system, an original speech signal recorded by a single microphone, the original speech signal containing voice characteristics of a user;

filtering the original speech signal to obtain a filtered speech signal that excludes the voice characteristics of the user;

performing voice conversion on the original speech signal to obtain a licensed voice signal containing voice characteristics of a licensed user, the voice characteristics of the user being excluded from the filtered speech signal, wherein the filtered speech signal and the licensed voice signal form a multi-channel input;

generating a single-channel representation of the multi-channel input by combining frames of the filtered speech signal with corresponding frames of the licensed voice signal in a weighted manner such that at least some frames of the filtered speech signal are assigned different weights; and performing, via an automatic speech recognition (ASR) model, speech recognition on the single-channel representation of the multi-channel input to generate a transcript of the original speech signal.

9. The computing system of claim 8, wherein the programming instructions further cause the computing system to perform the following operation:

generating a synthetic speech signal by processing the transcript using a text-to-speech system.

10. The computing system of claim 8, wherein speech recognition is performed on the single-channel representation during run-time of the speech processing system.

11. The computing system of claim 8, wherein the programming instructions further cause the computing system to perform the following operation:

selecting the licensed user based on a closest matching target speaker representation from a group of target speaker representations.

12. The computing system of claim 8, wherein the programming instructions further cause the computing system to perform the following operation:

selecting the licensed user based on a least matching target speaker representation from a group of target speaker representations.

13. The computing system of claim 8, wherein the frames of the filtered speech signal and the corresponding frames of the licensed voice signal are time-domain frames having a predefined length.

14. A method comprising:

receiving, by a speech processing system, an original speech signal recorded by a single microphone, the original speech signal containing voice characteristics of a user;

filtering the original speech signal to obtain a filtered speech signal that excludes the voice characteristics of the user;

performing voice conversion on the original speech signal to obtain a licensed voice signal containing voice characteristics of a licensed user, the voice characteristics of the user being excluded from the filtered speech signal, wherein the filtered speech signal and the licensed voice signal form a multi-channel input;

generating a single-channel representation of the multi-channel input by combining bins of the filtered speech signal with corresponding bins of the licensed voice signal in a weighted manner such that at least some of the bins of the filtered speech signal are assigned different weights; and performing, via an automatic speech recognition (ASR) model, speech recognition on the single-channel representation of the multi-channel input to generate a transcript of the original speech signal.

15. The method of claim 14, further comprising:
generating a synthetic speech signal by processing the transcript using a text-to-speech system.

16. The method of claim 14, wherein speech recognition is performed on the single-channel representation during run-time of the speech processing system.

17. The method of claim 14, further comprising:
selecting the licensed user based on a closest matching target speaker representation from a group of target speaker representations.

18. The method of claim 14, further comprising:
selecting the licensed user based on a least matching target speaker representation from a group of target speaker representations.

19. The method of claim 14, wherein the bins of the filtered speech signal and the corresponding bins of the licensed voice signal are frequency bins of a predefined size.

* * * * *